(12) United States Patent
Nagaoka

(10) Patent No.: US 7,178,003 B2
(45) Date of Patent: Feb. 13, 2007

(54) DATA PROCESSING APPARATUS, DATA PROCESSING SYSTEM, AND ACCESS AREA CONTROL METHOD

(75) Inventor: Takeshi Nagaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 159 days.

(21) Appl. No.: 10/347,391

(22) Filed: Jan. 21, 2003

(65) Prior Publication Data

US 2003/0172244 A1   Sep. 11, 2003

(30) Foreign Application Priority Data

Mar. 8, 2002   (JP) ............................. 2002-064240

(51) Int. Cl.
G06F 12/00 (2006.01)
G06F 13/00 (2006.01)

(52) U.S. Cl. ................... 711/202; 711/200; 711/220

(58) Field of Classification Search ................ 711/219, 711/220, 154, 200, 202
See application file for complete search history.

(56) References Cited

U.S. PATENT DOCUMENTS 5,696,924 A * 12/1997 Robertson et al. .......... 711/202

6,779,098 B2 * 8/2004 Sato et al. ................... 711/168
2001/0034805 A1   10/2001 Usui et al.

FOREIGN PATENT DOCUMENTS

JP   7-262125   10/1995

OTHER PUBLICATIONS

Patent Abstracts of Japan of JP 07262125 A published Oct. 13, 1995.

* cited by examiner

Primary Examiner—Tuan V. Thai
(74) Attorney, Agent, or Firm—Staas & Halsey LLP

(57) ABSTRACT

An address converter has a base address register and address mask register for setting the start address and range, respectively, of a transparent mode access permitted area. By using the values of these base address register and address mask register, the address converter converts an address signal (address value) supplied from an external bus master into an address signal within a predetermined range from the start position of the transparent mode access permitted area. A transparency controller executes transparent mode access by using the converted address signal. This makes it possible to connect devices having different address bus widths to an external bus without forming any new external circuit, and to set an arbitrary transparent mode access permitted area.

16 Claims, 6 Drawing Sheets

F I G. 3
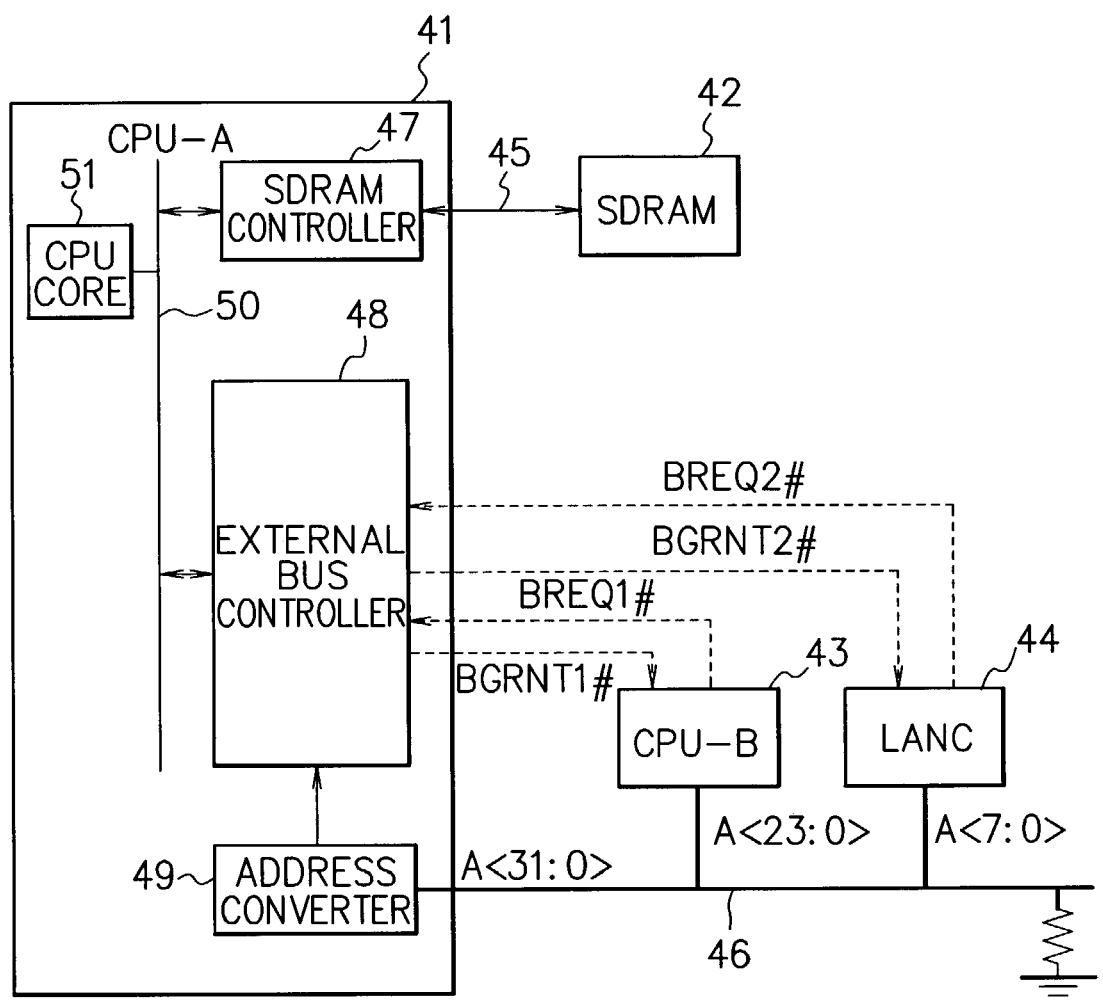

DATA PROCESSING APPARATUS, DATA PROCESSING SYSTEM, AND ACCESS AREA CONTROL METHOD

CROSS-REFERENCE TO RELATED APPLICATIONS

This application is based upon and claims priority of Japanese Patent Application No. 2002-064240, filed on Mar. 8, 2002, the contents being incorporated herein by reference.

BACKGROUND OF THE INVENTION

1. Field of the Invention

The present invention relates to a data processing apparatus, data processing system, and access area control method and is particularly suitable to a data processing apparatus in which devices having different numbers of address signal lines are connected via an address bus.

2. Description of the Related Art

Conventionally, an information processing system in which a plurality of devices such as central processing units can access (can read out data from and write data in a memory) a memory area (memory space) composed of one or a plurality of memories exists. In one information processing system of this type, a plurality of devices are not connected to a memory bus for accessing a memory, but, as shown in FIG. 6, only a device 61 is connected to a memory bus 67. In this conventional information processing system shown in FIG. 6, another external device (not connected to the memory bus 67) 63 accesses a memory 62 via the device 61 connected to the memory bus 67.

As shown in FIG. 6, this information processing system comprises a central processing unit (CPU) 61, SDRAM (Synchronous Dynamic Random Access Memory) 62, external bus master 63, ROM 64, RAM 65, and input/output buffer (I/O) 66.

The CPU 61 has a CPU core 70 for performing arithmetic processing, an SDRAM controller 71 for performing data write and read to the SDRAM 62, and an external bus controller 72 for exchanging data with the external bus master 63 and the like. The CPU core 70, SDRAM controller 71, and external bus controller 72 are connected to an internal bus 73.

Also, the SDRAM 62 and the SDRAM controller 71 are connected via an SDRAM bus 67, and the external bus master 63 and the external bus controller 72 are connected via a general-purpose bus 68. This general-purpose bus 68 is connected to the ROM 64, RAM 65, and input/output buffer 66.

Referring to FIG. 6, examples of signals exchanged between the CPU 61 (external bus controller 72) and external bus master 63 through the general-purpose bus 68 are indicated by the dotted lines. These signals includes, e.g., a bus request signal BREQ#, a bus grant signal BGRNT#, an address signal A<31:0>, a data signal D<63:0>, a SDRAM select signal SDSEL#, and a read/write signal RW#.

"(Signal name)#" indicates that the signal is activated at low level, and "(signal name)<X:Y>" indicates that the signal is transmitted through a plurality of signal lines in parallel. For example, the address signal A<31:0> indicates that this address signal is transmitted through 32 address signal lines in parallel with a width of 32 bits. The same rules apply to "(signal name)#" and "(signal name)<X:Y>" hereinafter.

In the information processing system shown in FIG. 6, operations when the CPU 61 (CPU core 70) and external bus master 63 access the SDRAM 62 will be explained below. In the following explanation, each address bus width of the general-purpose bus 68 and internal bus 73 is 32 bits.

<When CPU 61 (CPU Core 70) Accesses SDRAM 62>

The CPU core 70 outputs the address signal (address value) and read/write signal to the internal bus 73. The SDRAM controller 71 detects that the address signal supplied via the internal bus 73 indicates a memory space in the SDRAM 62. On the basis of the supplied address signal and read/write signal, the SDRAM controller 71 controls the SDRAM bus 67 to access the SDRAM 62. This allows the CPU core 70 to access the SDRAM 62.

<When External Bus Master 63 Accesses SDRAM 62>

First, the external bus master 63 activates the bus request signal BREQ# and requests the CPU 61 (external bus controller 72) to issue the bus use right (to be simply referred to as the "bus right" hereinafter) of the general-purpose bus 68. In response to this request, the external bus controller 72 activates the bus grant signal BGRNT# and gives the external bus master 63 the bus right.

When acquiring the bus right of the general-purpose bus 68, the external bus master 63 activates the SDRAM select signal SDSEL# which indicates access to the SDRAM 62. In addition, the external bus master 63 outputs the address signal A<31:0> and read/write signal RW# to the general-purpose bus 68.

On the basis of the SDRAM select signal SDSEL#, the external bus controller 72 detects the access request from the external bus master 63 to the SDRAM 62. The external bus controller 72 outputs, to the internal bus 73, an address signal and read/write signal corresponding to the supplied address signal A<31:0> and read/write signal RW#, respectively. In addition, on the basis of these address signal and read/write signal supplied via the internal bus 73, the SDRAM controller 71 controls the SDRAM bus 67 to access the SDRAM 62.

As described above, access from the external bus master 63 to the SDRAM 62 is realized via the CPU 61. That is, access from the external bus master 63 to the SDRAM 62 is executed by a "transparent mode access function" by which the CPU 61 accesses the SDRAM 62 via the SDRAM bus 67 in response to a request from the external bus master 63.

In this "transparent mode access function", in response to a request from an external bus master (the external bus master 63) connected to an external bus (the general-purpose bus 68), a first bus master (the CPU 61) accesses a resource (in the above explanation, the SDRAM 62) which the external bus master cannot directly access and which is mapped in the memory space of the first bus master, thereby executing access from the external bus master to the resource. The access from the external bus master to the resource mapped in the memory space of the first bus master, which is realized by the transparent mode access function described above, is called "transparent mode access".

In the above conventional information processing system shown in FIG. 6, however, if the address bus width of the external bus master 63 with respect to the general-purpose bus 68 is smaller than the address bus width of the CPU 61, transmission mode access can be performed only to a partial area fixed in accordance with the address width of the external bus master 63 and cannot be performed for an arbitrary area. For example, when the address bus width of the external bus master 63 is 8 bits, the external bus master 63 can perform transmission mode access only to an area from "0000 0000 h" to "0000 00FF h" in the memory space of the CPU 61 ("h" indicates the hexadecimal notation, and the same shall apply hereinafter). Therefore, to allow the external bus master 63 to perform transparent mode access to an arbitrary area in the memory space, a new external circuit (device) must be formed. This increases the external circuit scale and complicates the wiring between the devices.

Also, if the address bus width of the external bus master 63 with respect to the general-purpose bus 68 is equal to the address bus width of the CPU 61, the whole memory space of the CPU 61 can be subjected to transparent mode access. Accordingly, if an access inhibited area which inhibits access from the outside is necessary in the memory space, an external circuit (device) for limiting input address signals must be formed. This increases the external circuit scale and complicates the wiring between the devices.

SUMMARY OF THE INVENTION

The present invention has been made to solve the above conventional problems, and has as its object to make it possible to connect devices having different address bus widths to an external bus without forming any new external circuit, and to set an arbitrary transparent mode access permitted area.

A data processing apparatus of the present invention includes an address conversion circuit having a base address register, and a transparency control circuit for executing transparent mode access. The address conversion circuit adds that start address value of a transparent mode access permitted area, which is set in the base address register to an access destination's address value which is supplied via an external bus. The transparency control circuit executes transparent mode access to the obtained address value.

In the present invention constructed as above, the externally supplied address value of the access destination is converted into the address value of the transparent mode access permitted area, and then transparent mode access is executed. Therefore, regardless of the address bus width of a device connected to the external bus, transparent mode access can be performed for an address value equal to or larger than the set value of the base address register.

When an address mask register is also included, this address mask register in which the range of a transparent mode access permitted area is set masks, in the address conversion circuit, some bits of an access destination's address value which is supplied via the external bus. Accordingly, a transparent mode access permitted area can be restricted regardless of the address bus width of a device connected to the external bus.

BRIEF DESCRIPTION OF THE DRAWINGS

FIG. 3 is a block diagram showing a practical example of the configuration of the information processing system according to the embodiment;

DETAILED DESCRIPTION OF THE PREFERRED EMBODIMENTS

An embodiment of the present invention will be described below with reference to the accompanying drawings.

Figure 1:
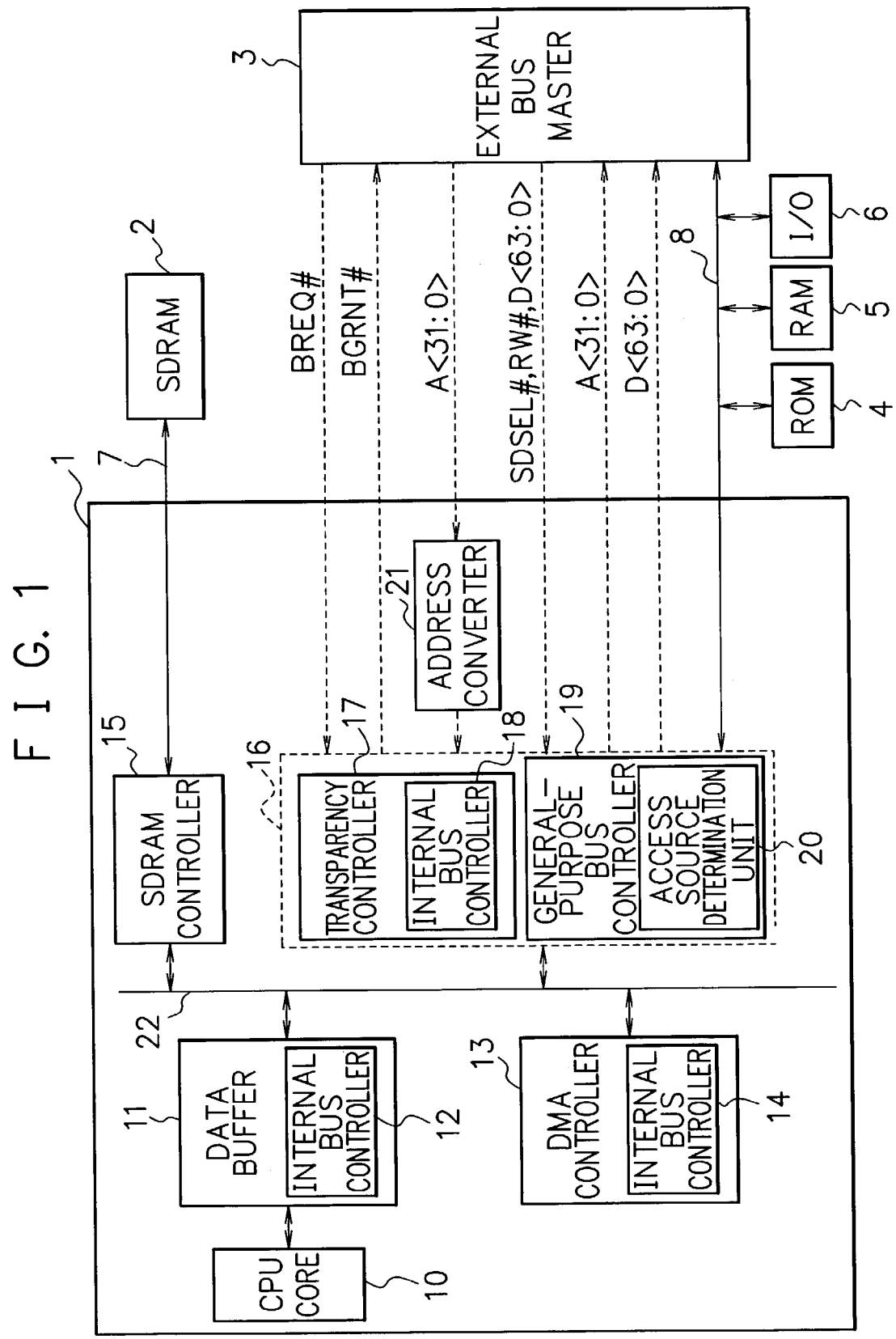
FIG. 1 is a block diagram showing an example of the configuration of an information processing system to which a data processing apparatus according to an embodiment of the present invention is applied.

FIG. 1 is a block diagram showing an example of the configuration of an information processing system to which a data processing apparatus according to an embodiment of the present invention is applied.

As shown in FIG. 1, the information processing system according to this embodiment comprises a CPU (data processing apparatus) 1, an SDRAM 2, an external bus master 3, a ROM 4, a RAM 5, and an input/output buffer (to be referred to as "I/O" hereinafter) 6. The CPU 1 includes a CPU core 10, a data buffer 11, a DMA (Direct Memory Access) controller 13, an SDRAM controller 15, an external bus controller 16, and an address converter 21. The external bus controller 16 has a transparency controller 17 and a general-purpose bus controller 19. The data buffer 11, the DMA controller 13, and the transparency controller 17 have internal bus controllers 12, 14, and 18, respectively, and the general-purpose bus controller 19 has an access source determination unit 20.

The SDRAM 2 and the SDRAM controller 15 are connected via an SDRAM bus 7, and the external bus master 3 and the external bus controller 16 are connected via a general-purpose bus 8. This general-purpose bus 8 is connected to various resources, i.e., the ROM 4, the RAM 5, and the I/O 6.

In the CPU 1, the data buffer 11, the DMA controller 13, the SDRAM controller 15, and the external bus controller 16 are connected to an internal bus 22, and the CPU core 10 is connected to the data buffer 11.

Referring to FIG. 1, examples of signals exchanged between the CPU 1 (external bus controller 16) and the external bus master 3 through the general-purpose bus 8 are indicated by dotted lines. These signals include, e.g., a bus request signal BREQ#, a bus grant signal BGRNT#, an address signal A<31:0>, a data signal D<63:0>, an SDRAM select signal SDSEL#, and a read/write signal RW# (a write operation at a low level, and a read operation at a high level).

Also, for an address signal (address bus) on the general-purpose bus 8, the external bus master 3 and the address converter 21 are connected, and the address converter 21 and the external bus controller 16 are connected, so that an address signal output from the external bus master 3 to the external bus controller 16 is supplied via the address converter 21.

As described above, the CPU 1 is the only bus master connected to the SDRAM 2 via the SDRAM bus 7. This simplifies the transmission path of the SDRAM bus 7 (the line between the SDRAM 2 and the bus master connected to the SDRAM 2) and realizes a high-speed operation of the SDRAM 2. In addition, no arbitration on the SDRAM bus 7 is necessary. This simplifies hardware and software for controlling the information processing system, in comparison with a system in which a plurality of bus masters are connected to the SDRAM bus 7. Furthermore, the bus master (external bus master 3) other than the CPU 1 need only be connected to the general-purpose bus 8. This reduces the circuit scale and cost of this bus master.

Figure 2:
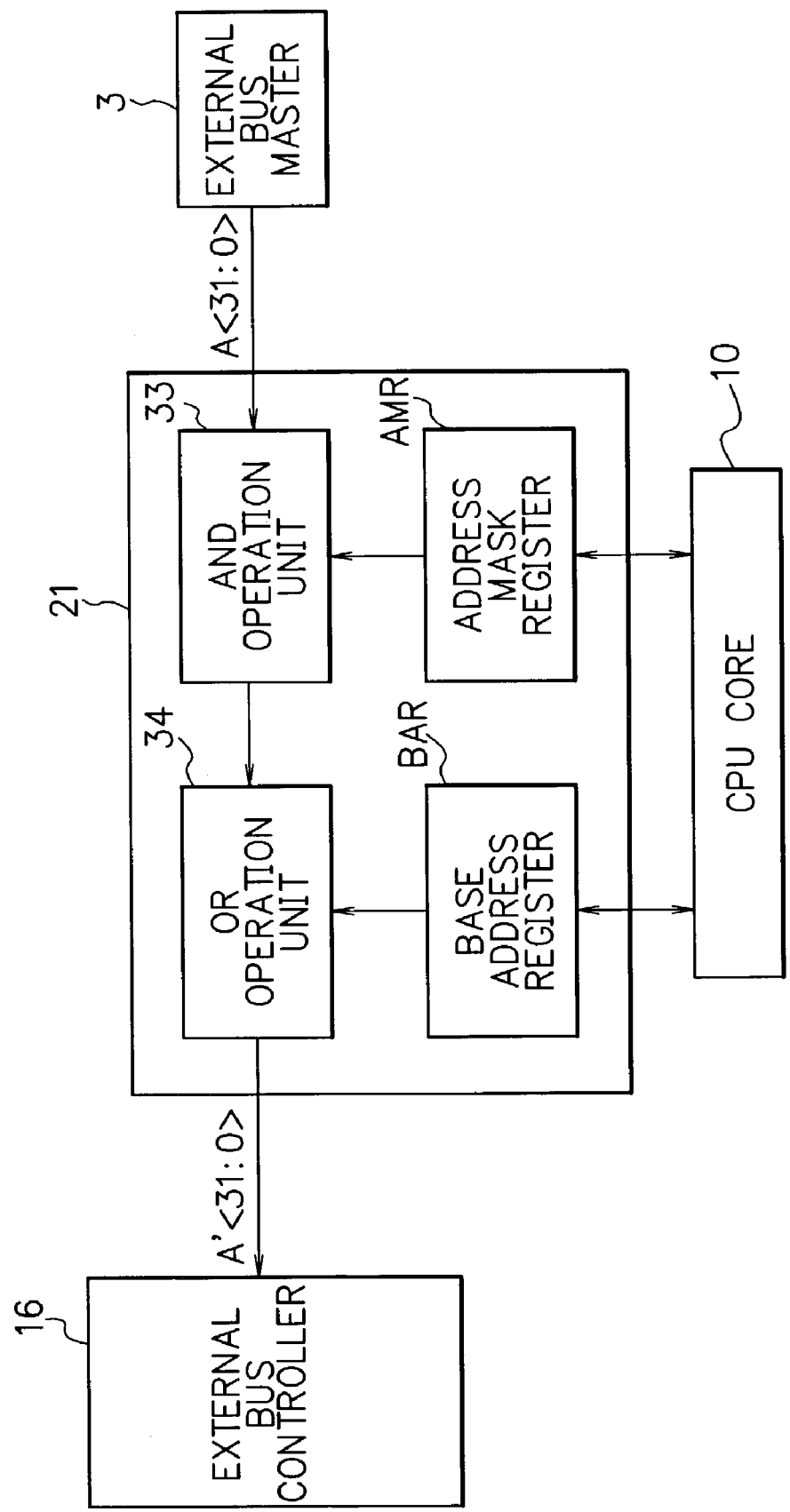
FIG. 2 is a block diagram showing an example of the arrangement of an address converter.

FIG. 2 is a block diagram showing an example of arrangement of the address converter 21 shown in FIG. 1. Note that the same reference numerals as in FIG. 1 denote blocks having the same functions in FIG. 2, and a repetitive explanation thereof will be omitted.

As shown in FIG. 2, the address converter 21 includes an address mask register AMR, a base address register BAR, an AND operation unit 33, and an OR operation unit 34.

The address mask register AMR is used for masking the address signal A<31:0> (address value) every bit, which is externally supplied via the address bus of the general-purpose bus 8. That is, this address mask register AMR designates whether to make each address signal line forming the address bus of the general-purpose bus 8 effective.

The base address register BAR designates the start address (to be referred to as a "base address" hereinafter) of an accessible region (which permits access) in the memory space of the CPU 1 (in FIG. 1, the SDRAM 2), in response to an external access via the general-purpose bus 8.

The AND operation unit 33 performs an AND operation of the externally supplied address signal A<31:0> (address value) and the set value of the address mask register AMR. The OR operation unit 34 performs an OR operation of the operation result from the AND operation unit 33 and the set value of the base address register BAR, and outputs the operation result as an address signal A'<31:0> to the external bus controller 16.

The address mask register AMR and base address register BAR in the address converter 21 are connected to the CPU core 10. Thus, the CPU core 10 can write set values in these address mask register AMR and base address register BAR.

Operations of this information processing system shown in FIG. 1 will be described below.

<When the External Bus Master 3 Accesses the SDRAM 2>

When accessing the SDRAM 2, the external bus master 3 first requests the CPU 1 (external bus controller 16) to issue the bus right of the general-purpose bus 8. More specifically, the external bus master 3 activates the bus request signal BREQ# and supplies the signal to the external bus controller 16. If determining in response to this request that the general-purpose bus 8 can be released, the external bus controller 16 activates the bus grant signal BGRNT# and gives the external bus master 3 the bus right of the general-purpose bus 8.

When acquiring the bus right of the general-purpose bus 8, the external bus master 3 activates the SDRAM select signal SDSEL# which indicates access to the SDRAM 2. In addition, the external bus master 3 outputs the address signal A<31:0>, the read/write signal RW#, etc., to the general-purpose bus 8. If this access to the SDRAM 2 is write access (the read/write signal RW# is at its low level), the external bus master 3 outputs the data signal D<63:0> to the general-purpose bus 8.

The address converter 21 converts the address of the address signal A<31:0> supplied from the external bus master 3 to the CPU 1 via the general-purpose bus 8.

The address converter 21 uses the address mask register AMR to mask the address signal A<31:0> supplied from the external bus master 3. More specifically, the address converter 21 causes the AND operation unit 33 to perform AND operations of the respective corresponding bits of the supplied address signal A<31:0> and the set value of the address mask register AMR. Consequently, the address signal corresponding to a bit having a set value '1' of the address mask register AMR remains in its original state (address value), and the address signal corresponding to a bit having a set value '0' changes to a state (address value) indicating '0'.

Additionally, the address converter 21 uses the base address register BAR to add a predetermined value (base address) to the operation result from the AND operation unit 33 by a logic operation. More specifically, the address converter 21 causes the OR operation unit 34 to perform OR operations of the respective corresponding bits of the output operation result from the AND operation unit 33 and the set value of the base address register BAR. Consequently, the set value (base address value) of the base address register BAR is added to the output operation result from the AND operation unit 33.

As described above, the address converter 21 converts the address of the address signal A<31:0> supplied from the external bus master 3, and supplies a converted address signal A'<31:0> to the external bus controller 16.

Also, on the basis of the SDRAM select signal SDSEL# activated by the external bus master 3, the transparency controller 17 in the external bus controller 16 detects an access request from the external bus master 3 to the SDRAM 2. The transparency controller 17 which has detected this access request starts an operation concerning the internal bus 22 of the CPU 1.

First, the transparency controller 17 requests the bus right of the internal bus 22. In response to this request, arbitration pertaining to the bus right of the internal bus 22 is performed, and the bus right of this internal bus 22 is given to the transparency controller 17. Note that the arbitration for the bus right of the internal bus 22 is performed by the internal bus controllers 12, 14, and 18 of the data buffer 11, DMA controller 13, and transparency controller 17, respectively, each of which is connected to the internal bus 22 and can function as a bus master.

The arbitration described above can also be performed such that one of the internal bus controllers 12, 14, and 18 always manages the bus right of the internal bus 22 and gives the bus right in accordance with a request from another internal bus controller. Alternatively, one of these internal bus controllers 12, 14, and 18 is allowed to preferentially use the internal bus 22 and, in accordance with a request from another internal bus controller, this internal bus controller which can preferentially use the internal bus 22 releases the bus right.

When acquiring the bus right of the internal bus 22, the transparency controller 17 outputs, to the internal bus 22, an address signal, a read/write signal, etc., for this internal bus 22, which correspond to the address signal A'<31:0> supplied from the address converter 21 and the read/write signal RW# supplied from the external bus master 3, etc.

When detecting the access to the SDRAM 2 in accordance with the address signal supplied via the internal bus 22, the SDRAM controller 15 controls the SDRAM bus 7 to execute this access to the SDRAM 2 on the basis of the supplied address signal and read/write signal, etc. This realizes transparent mode access to that area in the SDRAM 2, which is indicated by the address signal A'<31:0> (address value) output from the external bus master 3 and converted by the address converter 21.

If write (write access) is requested by the read/write signal on the internal bus 22, the SDRAM controller 15 writes the data signal D<63:0> supplied from the external bus master 3 via the transparency controller 17 in that area of the SDRAM 2, which is indicated by the supplied address signal. If read (read access) is requested by the read/write signal on the internal bus 22, the SDRAM controller 15 reads out data from that area in the SDRAM 2, which is indicated by the supplied address signal, and supplies the read-out data to the transparency controller 17 via the internal bus 22. The transparency controller 17 supplies the supplied data as the data signal D<63:0> to the external bus master 3 via the general-purpose bus 8.

When data write or read to the SDRAM 2 is completed as described above, the external bus master 3 inactivates the bus request signal BREQ# and notifies the external bus controller 16 that the general-purpose bus 8 is released. In response to this notification, the external bus controller 16 inactivates the bus grant signal BGRNT#. Thus, the transparent mode access from the external bus master 3 to the SDRAM 2 is completed.

<When the External Bus Master 3 Accesses a Resource (ROM 4, RAM 5, or I/O 6) Directly Connected to the General-Purpose Bus 8>

Similarly to access to the SDRAM 2, the external bus master 3 activates the bus request signal BREQ# and requests the external bus controller 16 to issue the bus right of the general-purpose bus 8. In response to this request, the external bus controller 16 activates the bus grant signal BGRNT# and gives the external bus master 3 the bus right of the general-purpose bus 8.

When acquiring the bus right of the general-purpose bus 8, the external bus master 3 outputs, to the general-purpose bus 8, the address signal A<31:0> corresponding to the resource to be accessed and the read/write signal RW#. Note that the SDRAM select signal SDSEL# remains inactivated (at its high level). If this access is write access (the read/write signal RW# is at its low level), the external bus master 3 outputs the data signal D<63:0> corresponding to the data bus width of the resource to the general-purpose bus 8.

In this way, the external bus master 3 executes access (data write or read) to the resource directly connected to the general-purpose bus 8. In this access, the output address signal from the external bus master 3 is supplied to the resource via the general-purpose bus 8 without any intervention of the CPU 1. When completing the data write or read to the resource, the external bus master 3 inactivates the bus request signal BREQ#. In response to this, the external bus controller 16 inactivates the bus grant signal BGRNT#, thereby terminating the access from the external bus master 3 to the resource connected to the general-purpose bus 8.

<When the CPU Core 10 Accesses the SDRAM 2>

First, the CPU core 10 supplies, to the data buffer 11, the address value corresponding to an area in the SDRAM 2, a read/write instruction, etc., thereby requesting access to the SDRAM 2. If this access to the SDRAM 2 is write access, the CPU core 10 supplies data to the data buffer 11.

In response to the access request to the SDRAM 2, the data buffer 11 uses its own internal bus controller 12 to request the bus right of the internal bus 22. When acquiring the bus right of the internal bus 22 by the arbitration described earlier, the data buffer 11 outputs, to the internal bus 22, the address signal, read/write signal, etc., corresponding to the address value, read/write instruction, etc., supplied from the CPU core 10.

When detecting this access to the SDRAM 2 from the supplied address signal, the SDRAM controller 15 controls the SDRAM bus 7 to execute the access to the SDRAM 2 on the basis of the supplied address signal and read/write signal.

If write (write access) is requested by the read/write signal on the internal bus 22, the SDRAM controller 15 writes data supplied from the data buffer 11 (CPU core 10) in that area of the SDRAM 2, which is indicated by the supplied address signal. On the other hand, if read (read access) is requested by the read/write signal, the SDRAM controller 15 reads out data from that area in the SDRAM 2, which is indicated by the supplied address signal, and supplies the read-out data to the data buffer 11 (CPU core 10) via the internal bus 22. In this manner, access from the CPU core 10 to the SDRAM 2 is executed. In this access from the CPU core 10 to the SDRAM 2, the CPU core 10 can access the entire area in the SDRAM 2 regardless of the set values of the address mask register AMR and the base address register BAR.

<When the CPU Core 10 Accesses a Resource (External Bus Master 3, ROM 4, RAM 5, or I/O 6) Directly Connected to the General-Purpose Bus 8>

The CPU core 10 supplies, to the data buffer 11, the address value corresponding to the resource directly connected to the general-purpose bus 8, read/write instruction, etc., thereby requesting access to the resource connected to the general-purpose bus 8. If this access to the resource connected to the general-purpose bus 8 is write access, the CPU core 10 supplies data to the data buffer 11.

In response to the access request to the resource connected to the general-purpose bus 8, the data buffer 11 uses its own internal bus controller 12 to request the bus right of the internal bus 22. When acquiring the bus right of the internal bus 22 by the arbitration described earlier, the data buffer 11 outputs, to the internal bus 22, the address signal, the read/write signal, etc., corresponding to the address value, the read/write instruction, etc., supplied from the CPU core 10.

The general-purpose bus controller 19 detects the access to the resource connected to the general-purpose bus 8, on the basis of the address signal supplied via the internal bus 22. If this general-purpose bus controller 19 does not have the bus right of the general-purpose bus 8, the general-purpose bus controller 19 requests, by a bus release request signal or the like, the bus master (in FIG. 1, the external bus master 3) having the bus right of the general-purpose bus 8 to release the general-purpose bus 8. The general-purpose bus controller 19 acquires the bus right of the general-purpose bus 8 and, on the basis of the supplied address signal and read/write signal, outputs, to the general-purpose bus 8, the address signal A<31:0> of the general-purpose bus 8 and the read/write signal RW#. If the access is write access, the general-purpose bus controller 19 outputs, to the general-purpose bus 8, the data signal D<63:0> corresponding to the data bus width of the resource to be accessed.

In this manner, access (data write or read) from the CPU core 10 to the resource directly connected to the general-purpose bus 8 is executed. In this access, the output address from the CPU core 10 is output to the general-purpose bus 8 (resource) without being converted. When completing the data write or read to the resource, the general-purpose bus controller 19 inactivates the signals concerning the control of the internal bus 22 and the general-purpose bus 8, thereby terminating the access to the resource connected to the general-purpose bus 8.

Note that access from the DMA controller 13 to the SDRAM 2 and access from the DMA controller 13 to a resource directly connected to the general-purpose bus 8 are the same as access from the data buffer 11 executed on the basis of a request from the CPU core 10 as described above, so a detailed description thereof will be omitted.

In access from the CPU core 10 or DMA controller 13 in the CPU 1 as described above, the SDRAM controller 15 and the general-purpose bus controller 19 detect access to the SDRAM 2 and access to a resource directly connected to the general-purpose bus 8, on the basis of the address signal supplied via the internal bus 22. However, the present invention is not limited to this operation. That is, access to the SDRAM 2 and access to a resource directly connected to the general-purpose bus 8 can also be detected by supplying, to the SDRAM controller 15 and the general-purpose bus controller 19, signals indicating access to the SDRAM 2 and access to the resource directly connected to the general-purpose bus 8 by using individual signal lines or the like.

Alternatively, in access from the CPU core 10 or DMA controller 13 in the CPU 1, a signal which indicates, by one logic level of binary logic, that the access destination is the SDRAM 2, and indicates, by the other logic level, that the access destination is a resource connected to the general-purpose bus 8, can be supplied to the SDRAM controller 15 and the general-purpose bus controller 19 via the internal bus 22. The SDRAM controller 15 and the general-purpose bus controller 19 thereby can respectively detect the access destinations.

Also, the control timings (output timings and activation or inactivation timings) of the address signal, the data signal, and the control signals (e.g., the read/write signal, the bus request signal, the bus grant signal, and the SDRAM select signal) on the general-purpose bus 8 and the internal bus 22 are examples and follow the specifications of buses used as the general-purpose bus 8 and the internal bus 22. Note that optional buses can be used as these general-purpose bus 8 and internal bus 22.

In the information processing system shown in FIG. 1, if the data bus widths of an access source and an access destination are different, access is realized by coupling or dividing the data by the CPU 1 or external bus master 3 which can function as a bus master. Additionally, if a bus master has a data burst transfer function and the general-purpose bus 8 or internal bus 22 can transfer data by burst transfer, data can also be transferred by burst transfer.

In the information processing system shown in FIG. 1, when the external bus master 3 starts using the general-purpose bus 8 in order to access a resource (ROM 4, RAM 5, or I/O 6) directly connected to the general-purpose bus 8, this general-purpose bus 8 can also be logically disconnected from the CPU 1. In this case, in an access request from inside the CPU 1 to the resource connected to the general-purpose bus 8 when this general-purpose bus 8 is logically disconnected from the CPU 1, the access source determination unit 20 in the general-purpose bus controller 19 determines the access request source. If it is determined that this access request is issued from, e.g., the data buffer 11, the data buffer 11 is notified, by an internal bus busy signal (not shown) or the like, that the access request cannot be accepted.

Thus, the data buffer 11 interrupts the access to the general-purpose bus controller 19 and accesses the SDRAM 2 (SDRAM controller 15) alone via the internal bus 22. Also, the external bus master 3 accesses, via the general-purpose bus 8, a resource directly connected to the general-purpose bus 8.

As described above, when the external bus master 3 starts using the general-purpose bus 8 in order to access a resource connected to this general-purpose bus 8, the general-purpose bus 8 is logically disconnected from the CPU 1. Therefore, even while the external bus master 3 is using the general-purpose bus 8, access from the bus masters (data buffer 11 (CPU core 10) and DMA controller 13) to the SDRAM 2 can be performed independently of the operation of the external bus master 3.

In the above explanation, transparent mode access from the external bus master 3 to the SDRAM 2 connected to the CPU 1 via the SDRAM bus 7 is described. However, that memory space of the CPU 1, which can be accessed by transparent mode access can also be an internal area (e.g., a built-in RAM) of the CPU 1.

Figure 4:
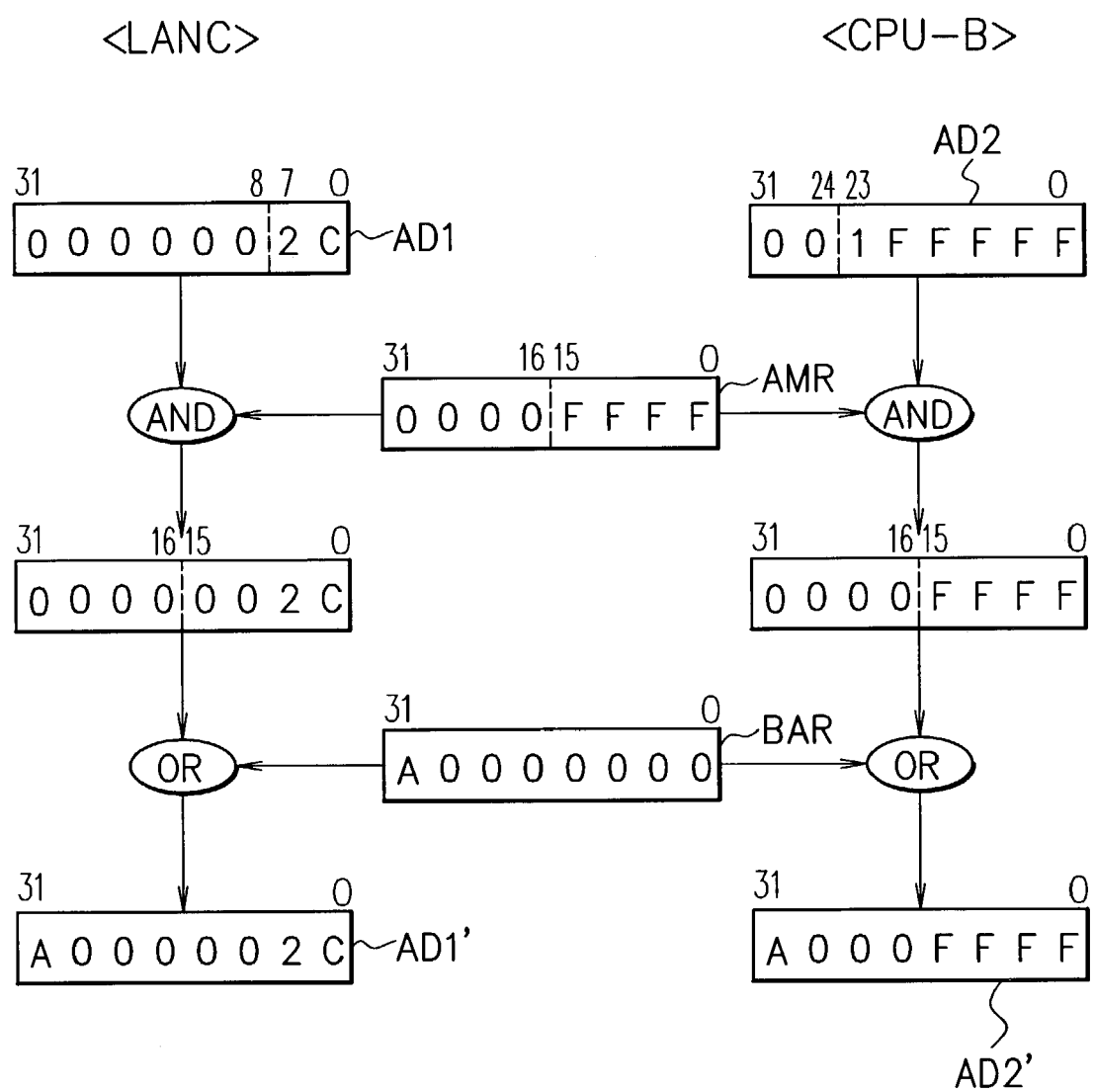
FIG. 4 is a view showing an example of address conversion by the address converter.

Address conversion when an external bus master connected to a general-purpose bus accesses a resource mapped in a memory space of a data processing apparatus according to this embodiment via the data processing apparatus will be described below in detail with reference to FIGS. 3 to 5.

FIG. 3 is a block diagram showing a practical example of the configuration of an information processing system according to this embodiment.

As shown in FIG. 3, this information processing system comprises a CPU-A (data processing apparatus) 41, an SDRAM 42, a CPU-B 43, and a LAN (Local Area Network) controller (to be referred to as a "LANC" hereinafter) 44. The CPU-A 41 is made up of the same functional blocks as the CPU 1 shown in FIG. 1. For the sake of descriptive simplicity, FIG. 3 shows only a CPU core 51, an SDRAM controller 47, an external bus controller 48, and an address converter 49. The CPU core 51 is equivalent to the CPU core 10 and data buffer 11 shown in FIG. 1.

Similarly to the information processing system shown in FIG. 1, the SDRAM 42 and the SDRAM controller 47 are connected via an SDRAM bus 45. The CPU-B 43, the LANC 44, and the CPU-A 41 are connected via a general-purpose bus 46. Also, the CPU core 51, the SDRAM controller 47, and the external bus controller 48 are connected to an internal bus 50.

In the CPU-A 41, an address signal supplied from the CPU-B 43 and the LANC 44 via the general-purpose bus 46 to the CPU-A 41 is supplied to the external bus controller 48 via the address converter 49. Other signals (in FIG. 3, only bus request signals BREQ1# and BREQ2# and bus grant signals BGRNT1# and BGRNT2# are shown) pertaining to the general-purpose bus 46 are supplied directly to the external bus controller 48 via the general-purpose bus 46.

In this information processing system shown in FIG. 3, the CPU-A 41, the CPU-B 43, and the LANC 44 can function as bus masters. The address bus widths (the numbers of address signal lines connected to the general-purpose bus 46) of the CPU-A 41, the CPU-B 43, and the LANC 44 with respect to the general-purpose bus 46 are 32, 24, and 8, respectively. That is, the CPU-A 41, the CPU-B 43, and the LANC 44 can receive and output a 32-bit address signal A<31:0>, a 24-bit address signal A<23:0>, and an 8-bit address signal A<7:0>, respectively, via the general-purpose bus 46.

An address bus (32 bits corresponding to the address signal A<31:0>) of the general purpose bus 46 is pulled down as it is connected to one end of a pull-down resistor the other end of which is connected to a reference voltage (e.g., the ground potential or ground GND). Thus, when the address signals of the CPU-A 41, the CPU-B 43, and the LANC 44 are in their high-impedance states, the address signal of the general-purpose bus 46 is at its low level.

In the information processing system shown in FIG. 3, when the CPU-A 41 (the CPU core 51 or a DMA controller (not shown)) is the bus master of the general-purpose bus 46, the CPU-B 43 and the LANC 44 change the output address signals to the high-impedance state, thereby releasing the address bus (general-purpose bus 46). The address signal A <31:0> is output from the CPU-A 41 to the address bus of the general-purpose bus 46, thereby accessing a resource, such as the CPU-B 43 or LANC 44, connected to the general-purpose bus 46.

On the other hand, when the CPU-B 43 or the LANC 44 is the bus master of the general-purpose bus 46, the bus request signal BREQ1# or BREQ2# is activated, and the CPU-A 41 releases the bus right of the general-purpose bus 46. Simultaneously, the bus grant signal BGRNT1# or BGRNT2# is activated, and the output address signal from the CPU-A 41 changes to its high-impedance state. Consequently, the address signal A<24:0> or A<7:0> is output to the address bus of the general-purpose bus 46 by the CPU-B 43 or the LANC 44, respectively.

In this manner, access to a resource connected to the general-purpose bus 46 and transparent mode access to the SDRAM 42 via the CPU-A 41 (the address converter 49, the external bus controller 48, and the SDRAM controller 47) are executed.

Note that when a plurality of external bus masters (the CPU-B 43 and the LANC 44) are connected to the general-purpose bus 46 as shown in FIG. 3, a bus master which is performing access can be identified by, e.g., the bus request signals BREQ1# and BREQ2# and the bus grant signals BGRNT1# and BGRNT2#.

In its entire memory space (in FIG. 3, the SDRAM 42, and this can include an internal RAM of the CPU-A 41), the CPU-A 41 permits external bus masters (the CPU-B 43 and the LANC 44) to access only an area having address values from "A000 000 h" to "A000 FFFF h". Since the start address (base address) of the area which the CPU-A 41 permits external bus masters to access is "A000 0000 h", the CPU-A 41 sets (writes) a value "A000 0000 h" in a base address register BAR in the address converter 49. Also, the range of the accessible area is "0000 h" to "FFFF h" and can be expressed by 16 bits. Therefore, the CPU-A 41 sets (writes) a value "0000 FFFF h" in an address mask register AMR in the address converter 49.

An example of address conversion by the address converter 49 when the value "A000 0000 h" is set in the base address register BAR and the value "0000 FFFF h" is set in the address mask register AMR as described above will be explained below with reference to FIG. 4.

Assume, for example, that the address signal A<7:0> indicating an address value AD1 ("2C h") is output from the LANC 44 to the general-purpose bus 46. In this case, the address converter 49 in the CPU-A 41 performs an AND operation of the supplied address value AD1 ("2C h") and the set value "0000 FFFF h" of the address mask register AMR. Since the address bus of the general-purpose bus 46 is pulled down, the address value "0000 002C h" and the set value "0000 FFFF h" are actually subjected to this AND operation.

The address converter 49 then performs an OR operation of the result "0000 002C h" of the above AND operation and the set value "A000 0000 h" of the base address register BAR. The address converter 49 supplies the result "A000 002C h" of this OR operation as a converted address value AD1' to the external bus controller 48, as if this value is output from the LANC 44. In this way, the address converter 49 performs address conversion, and transparent mode access from the LANC 44 to the memory space in the CPU-A 41 is executed.

Assume, for example, that the address signal A<23:0> indicating an address value AD2 ("1F FFFF h") is output from the CPU-B 43 to the general-purpose bus 46. In this case, the address converter 49 performs an AND operation of this address value AD2 ("1F FFFF h") (this value is actually "001F FFFF h" as in the case of the LANC 44 described above) and the set value "0000 FFFF h" of the address mask register AMR. Consequently, the upper eight bits (equivalent to the address signal A<23:0>) of the output address value from the CPU-B 43 are masked, and "0000 FFFF h" is obtained as the operation result.

The address converter 49 then performs an OR operation of the result "0000 FFFF h" of the above AND operation and the set value "A000 0000 h" of the base address register BAR. The address converter 49 supplies the result "A000 FFFF h" of this OR operation as a converted address value AD2' to the external bus controller 48, as if this value is output from the CPU-B 43. In this way, the address converter 49 performs address conversion, and transparent mode access from the CPU-B 43 to the memory space in the CPU-A 41 is executed.

Figure 5:
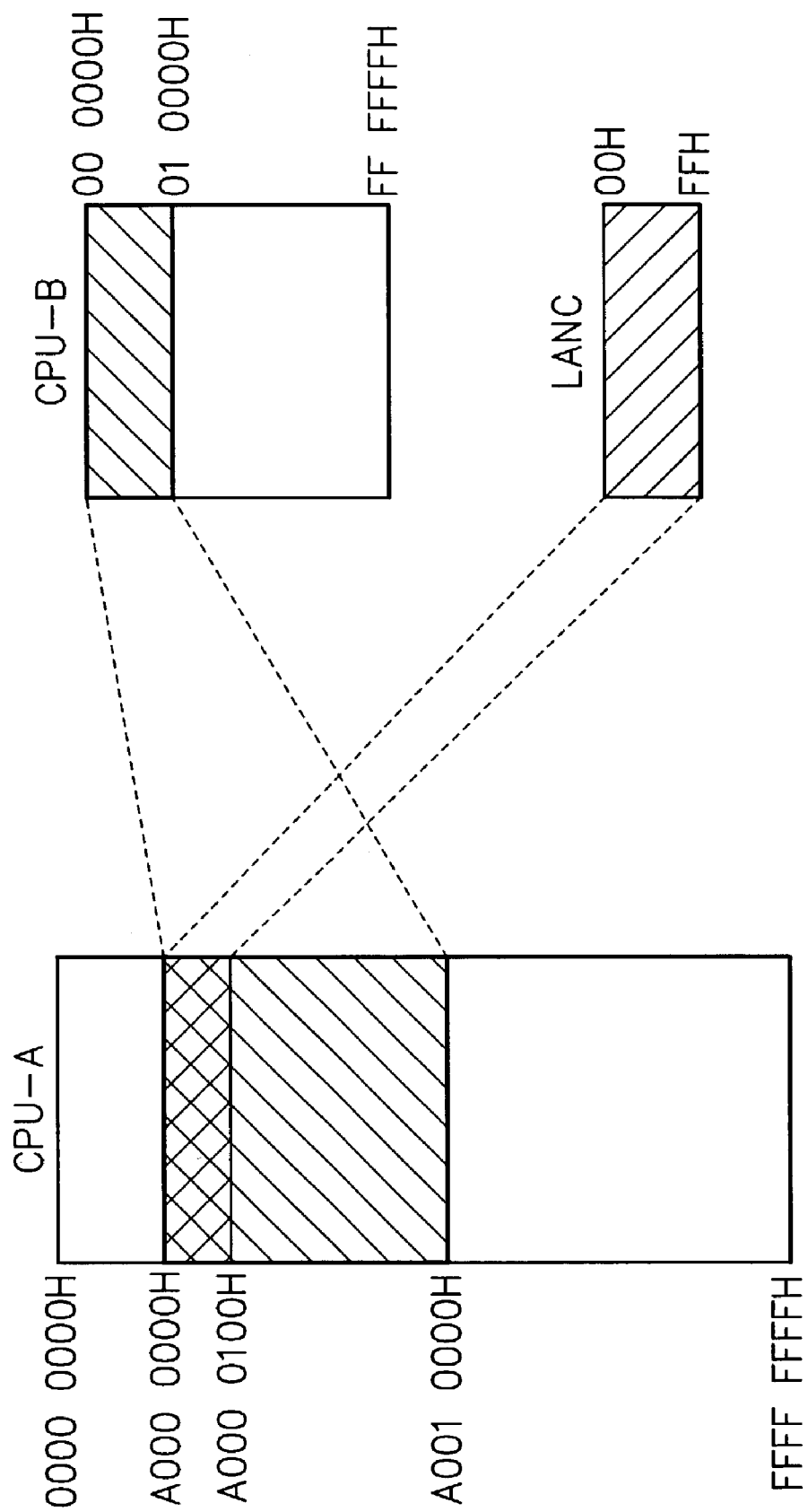
FIG. 5 is a view showing examples of memory maps in a CPU-A, CPU-B, and LANC constructing the information processing system shown in FIG. 3.
Figure 6:
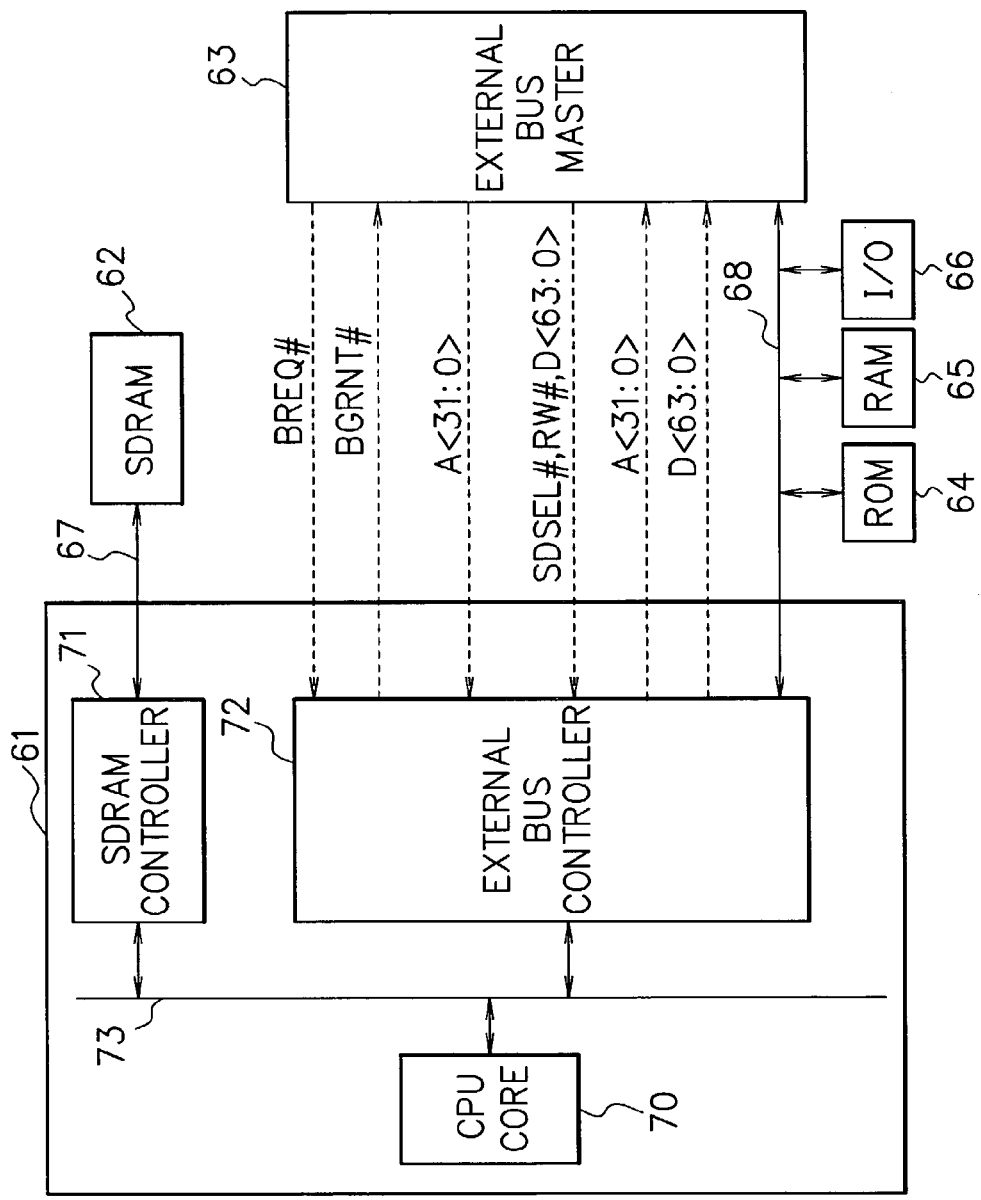
FIG. 6 is a block diagram showing an example of the configuration of a conventional information processing system capable of transparent mode access.

FIG. 5 shows memory maps in the CPU-A 41, the CPU-B 43, and the LANC 44 in the information processing system shown in FIG. 3, when the address converter 49 performs address conversion as described above.

In access from the CPU-B 43 to the CPU-A 41 (including the SDRAM 42), the address width of the CPU-B 43 is larger than the address width (the number of bits in which "1" is set in the address mask register AMR) of the area which is made accessible by the CPU-A 41. Hence, some bits of an address value which can be output by the CPU-B 43 are masked and nullified by the address mask register AMR.

In the CPU-B 43, therefore, as shown in FIG. 5, only the area ("A000 0000 h" to "A000 FFFF h") in the memory space of the CPU-A 41 is made accessible, and the other area becomes an access inhibited area to which access is inhibited. Also, the whole access permitted area ("A000 0000 h" to "A000 FFFF h") in the memory space of the CPU-A 41 is mapped as a partial area ("00 0000 h" to "00 FFFF h") in the memory space of the CPU-B 43.

In access from the LANC 44 to the CPU-A 41 (including the SDRAM 42), the address width of the LANC 44 is smaller than the address width of the area made accessible by the CPU-A 41. In the LANC 44, therefore, as shown in FIG. 5, a portion ("A000 0000 h" to "A000 00FF h") of the access permitted area in the memory space of the CPU-A 41 is mapped in the entire memory space ("00 h" to "FF h") of the LANC 44.

In this embodiment as explained above in detail, the address converter 21 has the base address register BAR for setting the start address of a transparent mode access permitted area, and the address mask register AMR for setting the range of this transparent mode access permitted area. The address converter 21 masks the address signal A<31:0>(address value) supplied from an external bus master via the general-purpose bus 8, in accordance with the set value of the address mask register AMR. In addition, the address converter 21 adds the set value of the base address register BAR and supplies the result to the transparency controller 17 for executing transparent mode access.

Thus, the address signal A<31:0> (address value) supplied from an external bus master is converted into an address signal within a predetermined range from the start position of the transparent mode access permitted area, and transparent mode access is executed by using the converted address signal A'<31:0>. Therefore, external bus masters having different address bus widths can be connected to the general-purpose bus 8 without forming any new external circuit for address conversion. It is also possible to limitedly set an optional area which can be accessed from external bus masters by transparent mode access, thereby forming an access inhibited area.

Also, the set values of the base address register BAR and the address mask register AMR can be written by the CPU core 10. This makes it possible to easily and freely set the start position and range of a transparent mode access permitted area.

Each of the above embodiments is merely a practical example when the present invention is practiced, so the technical scope of the present invention should not be limitedly interpreted by these embodiments. That is, the present invention can be practiced in various forms without departing from the technical idea and principal features of the invention.

As explained above, a data processing apparatus includes an address conversion circuit having a base address register for setting the start address value of a transparent mode access permitted area, and a transparency control circuit for executing transparent mode access. By using the value set in the base address register, the address conversion circuit converts an access destination's address value supplied via a first external bus. The transparency control circuit executes transparent mode access to the converted address value.

The transparent mode access is executed by converting the supplied access destination's address value into an address value equal to or larger than the start address value of the transparent mode access permitted area. Therefore, an optional device can be connected to the external bus, regardless of the address bus width of the device, without forming any new external circuit. In addition, an optional transparent mode access permitted area can be set.

Furthermore, when the address conversion circuit includes an address mask register for setting the range of a transparent mode access permitted area, this address conversion circuit masks that portion of an access destination's address value supplied via the first external bus, which exceeds the accessible area. Thus, an optional device can be connected to the external bus, regardless of the address bus width of the device, without forming any new external circuit. It is also possible to limitedly set an optional transparent mode access permitted area.

What is claimed is:

1. A data processing apparatus for accessing a memory connected to an internal bus in response to an external request received through a first external bus, said apparatus comprising:
   an address conversion circuit, including a base address register, setting a start position of an accessible area in a memory of said data processing apparatus, said address conversion circuit converting a supplied address value through said first external bus, using a value of said base address register; and
   an external bus control circuit for accessing said memory in said data processing apparatus, using an address value converted by said address conversion circuit;
   wherein said address conversion circuit further includes an address mask register for setting a range of said accessible area in said memory of said data processing apparatus, and converts said supplied address value using said value of said base address register and a value of said address mask register.

2. The apparatus of claim 1, wherein said value of said base address register and said value of said address mask register can be changed.

3. The apparatus according to claim 1, wherein said memory connected to an internal bus is composed of a memory control circuit and a memory component.

4. The apparatus according to claim 1, wherein said address conversion circuit further includes an addition circuit adding said value of said base address register to said supplied address value.

5. The apparatus according to claim 4, wherein said addition circuit is an OR operation circuit performing an OR operation of said value of said base address register and said supplied address value.

6. A data processing apparatus for accessing a memory connected to an internal bus in response to an external request received through a first external bus, said apparatus comprising:
   an address conversion circuit including an address mask register setting a range of an accessible area in a memory of said data processing apparatus, said address conversion circuit converting a supplied address value supplied through said first external bus, using a value of said address mask register, and
   an external bus control circuit for accessing said memory in said data processing apparatus, using an address value converted by said address conversion circuit;
   wherein said address conversion circuit further includes a mask circuit masking said supplied address value every bit in accordance with said value of said address mask register.

7. The apparatus of claim 6, wherein said mask circuit is an AND operation circuit performing an AND operation of said value of said address mask register and said supplied address value.

8. The apparatus according to claim 6, wherein said address mask register optionally sets each address signal line, which constitutes an address bus of said first external bus, to be effective or not.

9. A data processing apparatus for accessing a memory to an internal bus in response to an external request received through a first external bus, said apparatus comprising:
   a base address register setting a start position of an accessible area in said memory of said data processing apparatus;
   an address mask register setting a range of said accessible area in said memory of said data processing apparatus;
   an AND operation circuit performing an AND operation of a supplied address value supplied through said first external bus and a value of said address mask register;
   an OR operation circuit performing an OR operation of an operation result from said AND operation circuit and said value of said base address register; and
   an external bus control circuit for accessing said memory in said data processing apparatus, using an operation result from said OR operation circuit;
   wherein said value of said base address register and said value of said address mask register can be changed by said data processing apparatus.

10. The apparatus according to claim 9, wherein said memory connected to an internal bus is composed of a memory control circuit and a memory component.

11. A data processing system in which an external bus master is connected through a first external bus with a data processing apparatus capable of accessing a memory connected to an internal bus in response to a request from said external bus master, said data processing apparatus comprising:
   an address conversion circuit including a base address register and an address mask register respectively setting a start position and a range of an accessible area in a memory of said data processing apparatus, said address conversion circuit converting an address value, supplied from said external bus master, using a value of said base address register and a value of said address mask register; and an external bus control circuit for accessing said memory in said data processing apparatus, using an address value converted by said address conversion circuit;

wherein said value of said base address register and said value of said address mask register can be changed by said data processing apparatus.

12. The system according to claim 11, wherein said memory connected to an internal bus is composed of a memory control circuit and a memory component.

13. An access area control method controlling an accessible area in a memory of a data processing apparatus to be accessed by a memory connected to an internal bus in response to an external request, said method comprising:

converting a supplied address value, using a value of a base address register in which a start position of said accessible area in said memory of said data processing apparatus has been set; and accessing an arbitrary area in said memory in said data processing apparatus, using said converted address value;

wherein said supplied address value is converted using, in addition to said value of said base address register, a value of an address mask register in which a range of said accessible area in said memory of said data processing apparatus has been set, and wherein said value of said base address register and said value of said address mask register can be changed.

14. The method according to claim 13, wherein said supplied address value is converted by adding said value of said base address register to said supplied address value.

15. An access area control method controlling an accessible area in a memory of a data processing apparatus to be accessed by a memory connected to an internal bus in response to an external request received, said method comprising:

converting a supplied address value, using a value of an address mask register in which a range of said accessible area in said memory of said data processing apparatus has been set; and accessing an arbitrary area in said memory in said data processing apparatus, using said converted address value;

wherein said supplied address value is converted by masking every bit of said supplied address value in accordance with said value of said address mask register.

16. An access area control method for controlling an accessible area in a memory of a data processing apparatus to be accessed by a memory connected to an internal bus in response to an external request, said method comprising:

performing an AND operation of a supplied address value and a value of an address mask register in which a range of said accessible area in said memory space of said data processing apparatus has been set;

performing an OR operation of an operation result of said AND operation and a value of a base address register in which a start position of said accessible area in said memory space of said data processing apparatus has been set; and accessing an arbitrary area in said memory in said data processing apparatus, using said converted address value;

wherein said value of said base address register and said value of said address mask register can be changed.

* * * * *